(12) United States Patent
Reichel

(10) Patent No.: US 8,728,194 B2
(45) Date of Patent: May 20, 2014

(54) METHOD FOR CONTROLLING FOAMED SLAG IN A STAINLESS MELT IN AN ELECTRONIC ARC FURNACE

(75) Inventor: Johann Reichel, Duesseldorf (DE)

(73) Assignee: SMS Siemag AG, Duesseldorf (DE)

( * ) Notice: Subject to any disclaimer, the term of this patent is extended or adjusted under 35 U.S.C. 154(b) by 280 days.

(21) Appl. No.: 13/061,014

(22) PCT Filed: Aug. 7, 2009

(86) PCT No.: PCT/DE2009/001137
§ 371 (c)(1),
(2), (4) Date: Feb. 25, 2011

(87) PCT Pub. No.: WO2010/022703
PCT Pub. Date: Mar. 4, 2010

(65) Prior Publication Data
US 2011/0146447 A1 Jun. 23, 2011

(30) Foreign Application Priority Data
Aug. 26, 2008 (DE) .......................... 10 2008 045 054

(51) Int. Cl.
*C21C 5/52* (2006.01)
*C21B 15/00* (2006.01)
*C21B 3/02* (2006.01)

(52) U.S. Cl.
USPC ................................ 75/10.12; 75/382; 65/20

(58) Field of Classification Search
USPC ....................................... 75/10.12, 382; 65/20
See application file for complete search history.

(56) References Cited

U.S. PATENT DOCUMENTS

| 5,611,838 | A | * | 3/1997 | Fritz et al. ..................... 75/10.38 |
| 6,793,708 | B1 | * | 9/2004 | Jones et al. ...................... 75/312 |
| 2003/0212502 | A1 | | 11/2003 | Paredes et al. |
| 2007/0133651 | A1 | * | 6/2007 | Gerhan et al. .................... 373/9 |

FOREIGN PATENT DOCUMENTS

| DE | 200 17 930 | 1/2001 |
| EP | 0 637 634 | 2/1995 |
| JP | 07 166222 | 6/1995 |
| WO | WO 01/72090 | 9/2001 |
| WO | WO 2007/009924 | 1/2007 |
| WO | WO 2007/087979 | 8/2007 |

* cited by examiner

*Primary Examiner* — George Wyszomierski
*Assistant Examiner* — Tima M McGurthy Banks
(74) *Attorney, Agent, or Firm* — Cozen O'Connor

(57) ABSTRACT

A method for controlling foamed slag in a stainless melt in an electric arc furnace. Slag level in the electric arc furnace is continuously detected thermographically as a function of time and slag level, and an addition of foaming material is controlled depending on the temperature and temperature gradient.

2 Claims, 1 Drawing Sheet

METHOD FOR CONTROLLING FOAMED SLAG IN A STAINLESS MELT IN AN ELECTRONIC ARC FURNACE

PRIORITY CLAIM

This is a U.S. national stage of Application No. PCT/DE2009/001137, filed on Aug. 7, 2009, which claims priority to German Application No: 10 2008 045 054.5, filed: Aug. 26, 2008, the contents of which are incorporated herein by reference.

BACKGROUND OF THE INVENTION

1. Field of the Invention

The invention is directed to a method for controlling foamed slag in a stainless melt in an electric arc furnace.

2. Related Art

The advantages of a favorably foaming slag in the electric arc furnace (EAF) are well known. WO 2007/087979 A1 can be referenced in this regard.

In electric arc furnace operation, the charge, i.e., primarily scrap and alloys, are melted by the arcs of electrodes while simultaneously forming a slag. Apart from its primary function, i.e., the removal of unwanted constituents from the melt, the slag performs a protective function when brought to a foaming state. In this state, the slag blankets the space between the electrode tips and the surface of the metal and, owing to its poor thermal conductivity, protects the refractory lining of the furnace against the radiant energy of the electric arc.

The foamed slag sharply reduces the intensive radiation of the arc with respect to the wall of the electric furnace and therefore facilitates the input of energy into the metal melt. This substantially prolongs the life of the refractory material of the furnace.

To achieve these benefits, the foamed slag must always be at a predetermined level in the furnace.

EP 637 634 A1 discloses a method for producing a metal melt in which the level of the foamed slag is determined acoustically, namely by detecting a frequency range characteristic of slag foaming. Comparison of the measured sound level with a reference sound level yields reference points for controlling the addition of foaming agents.

WO 2007/009924 A1 also addresses the determination of the level of the foamed slag in an electric arc furnace. In this case, the determination of structure-borne sound is used as measuring technique.

SUMMARY OF THE INVENTION

It is an object of the invention to provide an improved method for controlling foamed slag.

According to one embodiment of the invention, the slag level in the electric arc furnace is continuously detected thermographically as a function of time and slag level, and the addition of foaming material is controlled depending on the temperature and temperature gradient.

Accordingly, one embodiment of the invention is directed to a method for controlling foamed slag in a stainless melt in an electric arc furnace with the addition of a foaming material based on a thermographic system. The addition is controlled based on optimal formation of the foamed slag measured by its level. The level of the slag causes a change in temperature in a thermal element. The thermal element is installed in the wall of the electric arc furnace and has an extremely high thermal conductivity. This also affords the possibility of measuring the temperature gradient.

Therefore, the slag level is detected on the basis of a continuous temperature measurement by the thermal element. The rapid change in temperature caused by the different slag level is received by a receiver in the control stand via wireless infrared signal transmission. The addition of foaming material is controlled in accordance with the temperature curve.

BRIEF DESCRIPTION OF DRAWINGS

The invention will be described more fully in the following with reference to the drawings.

In the drawings.

DETAILED DESCRIPTION OF THE DRAWINGS

Figure 1:
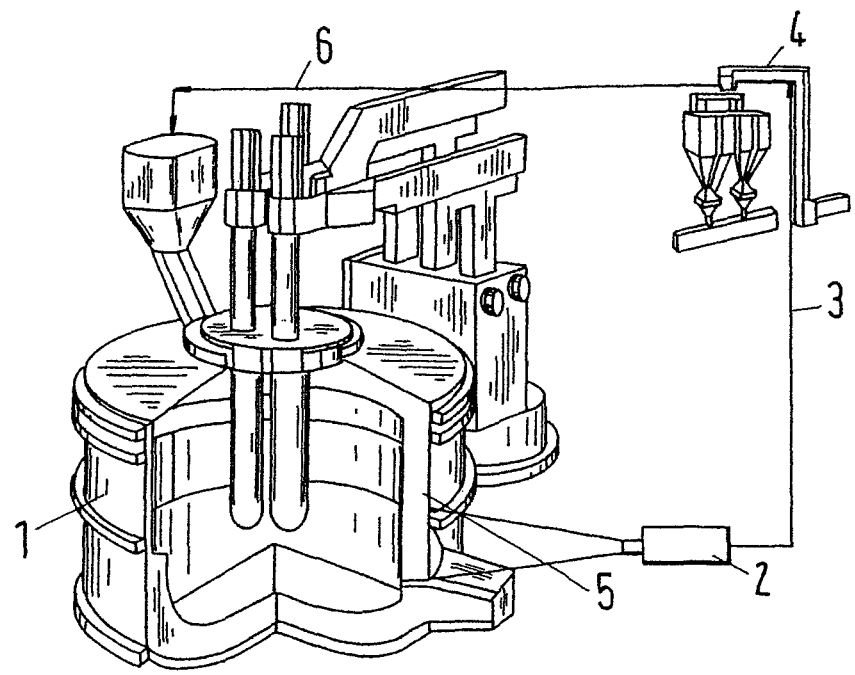
FIG. 1 is a partial cutaway view of a basic concept of the measuring system according to one embodiment of the invention.

The electric arc furnace, which will not be described in more detail, is designated by 1 in FIG. 1. An infrared camera 2 receives the infrared beam emitted by the thermal element 5 which is arranged in an area of the furnace wall, i.e., at a height located in the usual area of the existing or required foamed slag level, and sends the measured values as control signals 3 to the material adding device 4 which in turn feeds the foaming material to the electric arc furnace 1. This is indicated by arrow 6.

Figure 2:
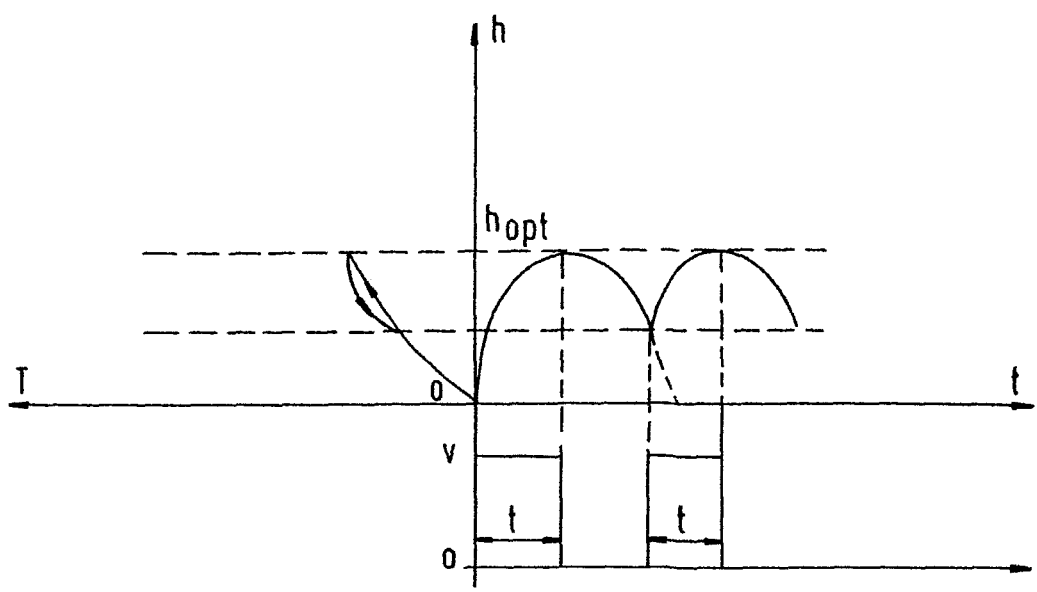
FIG. 2 is a graph of a principle for controlling the addition of foaming material.

FIG. 2 shows the slag level over the time axis.

The foamed slag develops quasi-exponentially based on its natural composition as can be seen from FIG. 2. As was already mentioned, the foaming material is introduced by the material adding device 4 into a zone between the slag and the metal and undergoes the process of dissolution with a parallel reduction of iron oxide.

The slag level is identified by the measuring system through a temperature development at the thermal element 5. The temperature of the thermal element 5 is a function of time and slag level as is represented by equations 1 and 2.

The measuring system provides:

$$a \text{ temperature signal as a time function: } T = f(t) = f'(h) \quad (1)$$

$$a \text{ temperature gradient as a time function: } dT = df'(h) \quad (2)$$

The thermal element 5 is installed in the wall of the electric arc furnace 1 and is characterized by an extremely high thermal conductivity. In this way, the temperature gradient can be determined (see equation 3).

$$\text{The control system supplies: } dT/dt = g(h,t) = df'(h)/dt \quad (3)$$

Therefore:

the addition rate $dm/dt$ (in kg/min) is provided by equations 4 and 5—

$$dm/dt = v \text{ at } T > T_{min} \text{ and } dT/dt \geq 0 \quad (4)$$

$$dm/dt = 0 \text{ at } T = T_{opt} \text{ and } dT/dt < 0 \quad (5)$$

and a duration of the addition t (in minutes) can be determined from equations 6 and 7

$$\Delta t = t, \text{ provided } dT/dt \geq 0 \quad (6)$$

$$\Delta t = 0, \text{ provided } dT/dt < 0 \quad (7)$$

Since thermography is a non-contact measuring process, distant objects can also be mapped. The IR signals of the camera are received in the control console as radio signals and are converted into the control signals based on equations 4 to 7.

Provided that the mathematical sign of the gradient is positive, which indicates an upward trend in temperature but, at the same time, also an uncovered condition of the electrodes, the addition of material is carried out at a constant rate. On the other hand, the control can also be based on a different practice-oriented function in this case. When the temperature gradient is zero or negative, the addition of material is completely stopped or proceeds at a decreased rate according to another practice-oriented function.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for controlling foamed slag in a stainless melt in an electric arc furnace, comprising:
continuously detecting slag level in the electric arc furnace thermographically using a thermal element installed in a wall of the electric arc furnace, wherein the temperature (T) of the thermal element is a function of time (t) and the slag level (h) as represented by:

$$T = f(t) = f'(h); \text{ and} \qquad (1)$$

$$dT = df'(h), \qquad (2)$$

a temperature signal as a time function being represented by equation (1) and a temperature gradient as a time function being represented by equation (2); and
adding foaming material based at least in part on a temperature and a temperature gradient of the electric arc furnace,
wherein when a mathematical sign of the temperature gradient is positive, the addition of the foaming material proceeds at a constant rate, and when the mathematical sign of the temperature gradient is negative or the temperature gradient is zero, the addition of the foaming material is completely stopped or proceeds at a decreased rate.

2. The method according to claim 1, wherein an infrared beam emitted by the thermal element is detected by a thermographic camera and is sent to the foaming material feed as a control signal.

\* \* \* \* \*